United States Patent [19]

Begun

[11] Patent Number: 5,109,506

[45] Date of Patent: Apr. 28, 1992

[54] MICROCOMPUTER SYSTEM INCLUDING A MICROPROCESSOR RESET CIRCUIT

[75] Inventor: Ralph M. Begun

[73] Assignee: International Business Machines Corp., Armonk, N.Y.

[21] Appl. No.: 367,653

[22] Filed: Jun. 19, 1989

[51] Int. Cl.⁵ .............................................. G06F 11/00
[52] U.S. Cl. .................................... 395/575; 371/12; 371/61
[58] Field of Search .................... 371/12, 62, 61; 364/200, 270, 270.1, 271.4, 271.5, 934, 934.1, 934.51, 934.71

[56] References Cited

U.S. PATENT DOCUMENTS

| | | | |
|---|---|---|---|
| 4,405,982 | 9/1983 | Ruhnau et al. | 364/200 |
| 4,410,991 | 10/1983 | Lenart | 371/12 |
| 4,528,629 | 7/1985 | Breitling | 371/12 |
| 4,538,273 | 8/1985 | Lasser | 371/62 |
| 4,803,682 | 2/1989 | Hara et al. | 371/12 |
| 4,845,467 | 7/1989 | Nagaoka | 371/12 |
| 4,903,193 | 2/1990 | Nakamura | 364/200 |
| 4,942,311 | 7/1990 | Harada | 371/12 |
| 4,964,123 | 10/1990 | Umemoto | 371/12 |

Primary Examiner—Charles E. Atkinson
Attorney, Agent, or Firm—Mark P. Kahler

[57] ABSTRACT

A microprocessor based computer system is provided which includes a reset circuit having a phase error detector for detecting a phase error between an initial reset signal and a clock signal provided to the microprocessor clock input. The reset circuit further includes a phase error corrector for adjusting the phase of the clock signal if a phase error is detected so as to substantially minimize the phase error. The reset circuit includes a reset signal regenerator for providing a new reset signal to the reset input of the microprocessor when the phase of the clock signal is adjusted.

5 Claims, 7 Drawing Sheets

NO PHASE ERROR

FIG. 6

PHASE ERROR

FIG. 7

MICROCOMPUTER SYSTEM INCLUDING A MICROPROCESSOR RESET CIRCUIT

BACKGROUND OF THE INVENTION

1. Field Of The Invention

This invention relates in general to microprocessor based computer systems and, more particularly, to reset circuitry for such computer systems.

2. Related Art

Figure 1:
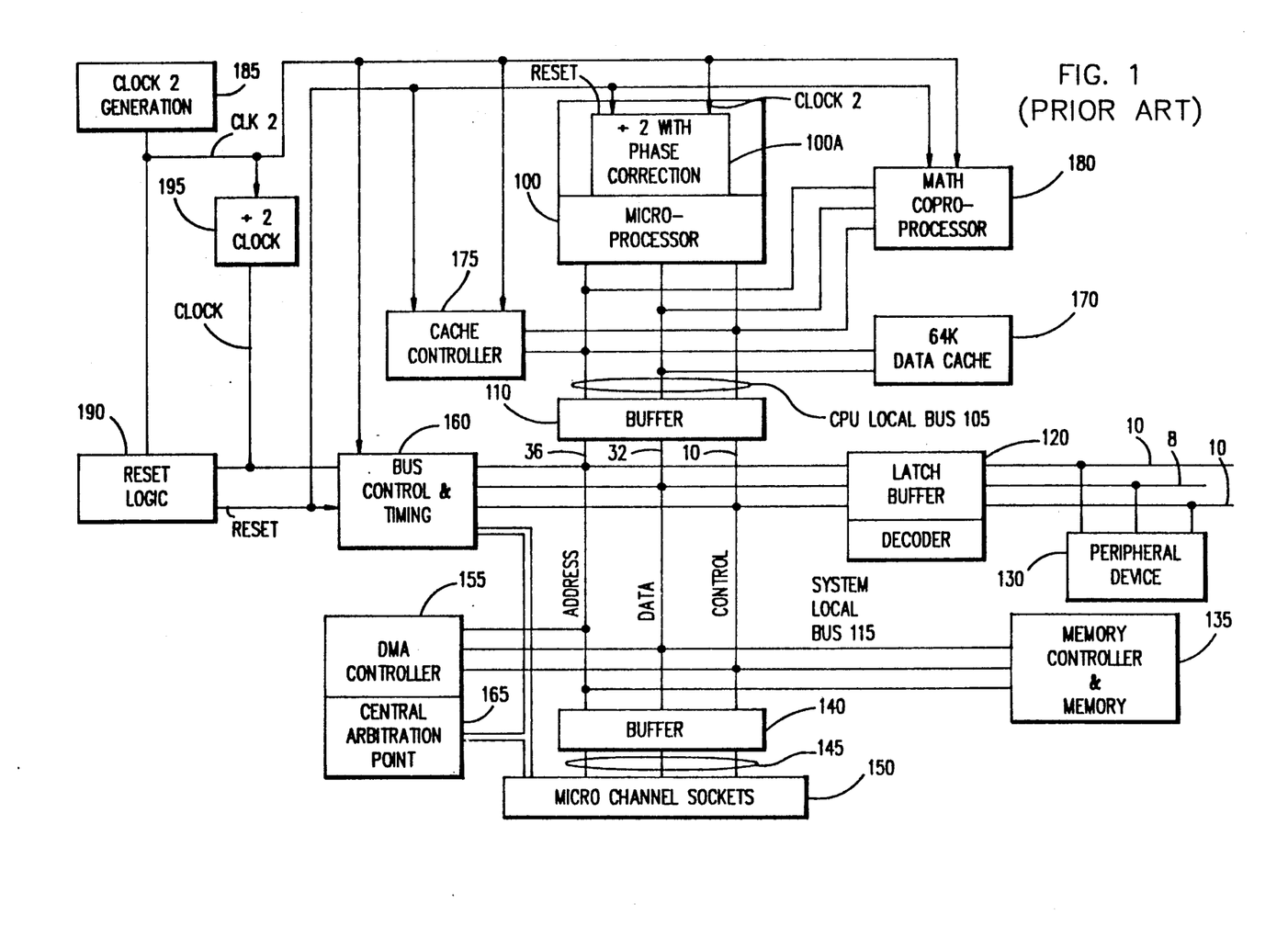
FIG. 1 is a high level block diagram of a conventional dual bus computer.

Microprocessors such as the Intel 386 (TM) and i486 (TM) include a reset input to enable the microprocessor to be initialized in a known or defined state when power to the microprocessor is turned on. (386 and i486 are trademarks of Intel Corporation.) A computer employing an Intel 386 microprocessor and associated power reset circuitry is shown in FIG. 1 as computer 10. Before discussing this power reset circuitry, it is helpful to describe computer 10 in general terms.

Computer 10 is a dual bus computer which includes the aforementioned microprocessor now designated as microprocessor 100. Microprocessor 100 includes a reset input shown in FIG. 1 as RESET. Microprocessor 100 is coupled via a CPU local bus 105 to a buffer 110 which couples CPU local bus 105 to a system local bus 115. System local bus 115 is coupled via a latch/buffer/decoder 120 to a planar I/O (input/output) bus 125 to which peripheral devices such as device 130 are connected. System local bus 115 is further coupled to a memory controller and memory 135. System local bus 115 is also coupled via a buffer 140 and a Micro Channel (TM) bus 145 to Micro Channel (TM) sockets or slots 150 into which various adapter cards may be inserted. (Micro Channel is a trademark of the International Business Machines Corporation.) A direct memory access (DMA) controller 155 is coupled to system local bus 115 to facilitate direct access to memory 135 without the intervention of microprocessor 100. Computer 10 further includes a bus control and timing circuit 160 which is coupled to system local bus 115 to permit control and timing of bus 115. A central arbitration point 165 is coupled to both bus control and timing circuit 160 and Micro Channel sockets 150. Central arbitration point 165 determines which functional entity gets access to the Micro Channel bus 145, be it microprocessor 100, a bus master plugged into one of Micro Channel sockets 145 or DMA controller 155, for example.

A cache memory 170 is coupled to CPU local bus 105 and microprocessor 100 as shown. To control the operation of cache memory 170, an Intel 82385 cache controller 175 is coupled to CPU local bus 105 and system local bus 115 as shown. When computer 10 is being referred to as a dual bus computer, it is the CPU local bus 105 and the system local bus 115 which are the two busses being referenced. Each of busses 105 and 115 includes respective address, data and control busses. To facilitate the processing of floating point operations, a math coprocessor 180 is coupled to CPU local bus 105.

As mentioned earlier, microprocessor 100 includes a reset input designated RESET. Microprocessor 100 further includes a clock input designated CLK2 to which a clock frequency of double (2×) the microprocessor internal clock frequency is provided. The internal clock frequency of microprocessor 100 is defined to be equal to 1×. A divide by two and phase correction circuit 100A is included within microprocessor 100 such that the CLK2 or 2× clock signal (for example, at 50 MHz) provided to the microprocessor CLK2 input is divided down to 1× (or 25 MHz, for example) for use internal to microprocessor 100. A CLK2 generation circuit or clock oscillator 185 is provided to generate the CLK2 signal. CLK2 generation circuit 190 includes a CLK2 output which is coupled to RESET LOGIC 190, a divide by 2 circuit 195, bus control and timing circuit 160, cache controller 175, microprocessor 100 and coprocessor 180 to provide clock information thereto. Reset logic 180 includes a RESET output which is coupled to the microprocessor RESET input, math coprocessor 180, cache controller 175 and bus control and timing circuit 160 to provide an appropriate reset pulse to such devices when system reset is desired. From FIG. 1 it is seen that divider circuit 195 divides the CLK2 clock signal by 2 to produce an external clock signal designated CLK which is provided to RESET LOGIC 190 and to bus control and timing circuitry 160. It is noted that the external clock CLK signal generated at the CLK output of divider circuit 195 exhibits a frequency substantially the same as the 1× internal clock frequency of microprocessor 100. For this reason, the CLK signal is referred to alternatively as the 1× external clock signal.

An overview of the operation of the 386 microprocessor with respect to clocking operations is now presented. As mentioned above, the 386 microprocessor operates from a two-times external clock or 2× clock external input. Thus, a 20 MHz 386 microprocessor requires a 40 MHz external clock signal at its CLK2 input and a 25 MHz 386 microprocessor requires a 50 MHz external clock signal at its CLK2 input.

Figure 2:
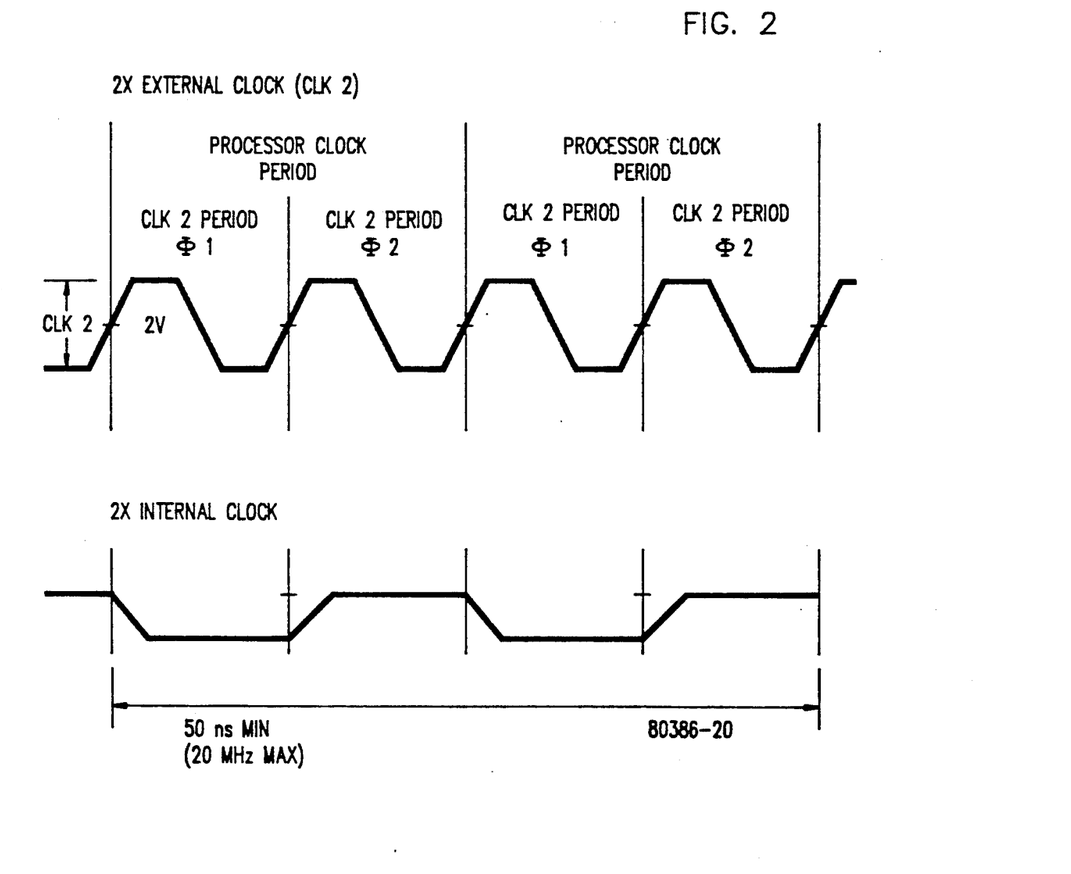
FIG. 2 is a timing diagram which shows the relationship between the internal 1× clock signal and the external 2× (CLK2) clock signal.

Internally, the 386 microprocessor generates its own one-times (1×) clock by dividing the CLK2 input signal by two. This 1× internal clock signal is used inside the 386 microprocessor to determine the timing of the various internal logic operations including operations which appear as microprocessor outputs. This 1× clock signal is also used internal to the 386 microprocessor to determine the appropriate sample time for external inputs. The timing relationship of this 1× internal clock signal to the CLK2 clock signal is shown in FIG. 2 in which the 1× internal clock signal is shown in the lowermost portion thereof and the CLK2 clock signal is shown in the uppermost portion thereof. The timing relationships relative to this 1× clock are documented by Intel in the 80386 Hardware Manual. The 1× internal clock signal is used to determine the appropriate phase of the CLK2 signal since multiple CLK2 phases are required to complete a 386 microprocessor bus cycle.

The typical 386 microprocessor based computer system will generate, external to the 386 microprocessor, its own 1× external clock signal since there is no 1× external clock output from the 386 microprocessor. As seen in FIG. 1, this external 1× clock signal is generated in computer 10 at the CLK output of divider circuit 195 as the CLK signal is. This 1× external clock signal or CLK signal is used by external logic to monitor or sample the 386 microprocessor and to control the necessary 386 microprocessor inputs.

The two separately generated 1× clocks, namely the internal 1× clock and the external 1× clock (CLK at divider 195) may undesirably differ in their phasing unless some means is provided to achieve synchronization of the internal 1× clock and the external 1× clock during the power up of microprocessor 100. This required synchronization action is typically provided by generation of the signal RESET which is provided to the RESET input of microprocessor 100. External logic, namely reset logic 190, triggers the active edge of the RESET signal relative to the externally generated 1× clock. That is, there is a known and fixed relationship between the active edge of the RESET signal and the externally generated 1× clock signal. The RESET signal is sampled by the 386 microprocessor on each CLK2 rising edge. The resulting RESET sample information is used by internal divide by 2 and phase correction circuitry 100A to change the phasing of the internal 1× clock if required to bring the internal 1× clock into sync with the external 1× clock.

To provide the computer user with a processor upgrade path in one type of computer 10, a daughter card (not shown) is provided which includes microprocessor 100, coprocessor 180, cache controller 175, cache 170 and the associated reset circuitry. This daughter card is alternatively referred to as a processor complex. The daughter card plugs into a planar board or motherboard containing the remaining components and devices of computer 10 shown in FIG. 1. In this manner, a daughter card containing a different microprocessor configuration than that originally provided with computer 10 can be plugged into the planar board to improve computer performance. An example of one computer employing such a daughter card arrangement is the IBM Personal System/2 Model 70 A21 computer. (Personal System/2 is a registered trademark of the International Business Machines Corporation.)

Microprocessor technology has advanced beyond the level of the 386 based computer 10 described above. More specifically, Intel Corporation has recently introduced the i486 microprocessor which offers significant processor performance benefits by incorporating a microprocessor, coprocessor, cache memory and cache controller on a single chip.

Unfortunately, a number of difficulties are encountered when attempting to outfit an existing computer such as computer 10 with a i486 microprocessor. It will be recalled that computer 10 includes an external 2× clock (CLK2), and the 386 microprocessor of computer 10 includes a CLK2 pin to which the 2× clock signal is provided. The 386 microprocessor further includes an internal divide by 2 circuit to produce an internal 1× clock. In contrast, the i486 microprocessor does not use the same internal clock phase setting approach via the microprocessor RESET pin as does the 386 microprocessor, but rather the i486 microprocessor employs a simple 1× clock pin. This means that a 25 MHz i486 operates from a 25 MHz clock input. In further contrast to the 386 microprocessor, the i486 microprocessor uses an internal frequency doubling circuit to generate an internal 2× clock.

Due to this arrangement, the i486 microprocessor assumes that the proper CLK phasing is implicit in the one-times (1×) CLK pin input to the i486. Thus, the i486 microprocessor does not sample its RESET input to achieve clock phase correction. This difference in RESET/CLK phasing between the 386 microprocessor and the i486 microprocessor causes 1× clock synchronization difficulties in an application where a processor upgrade from a 386 microprocessor to an i486 microprocessor is attempted, when minimal change to the remaining circuitry of computer 10 or other computer is desired.

BRIEF SUMMARY OF THE INVENTION

Accordingly, one object of the present invention is to provide reset circuitry for an advanced microprocessor based computer.

Another object of the present invention is to provide reset circuitry which permits an i486 microprocessor to operate in a computer which originally employed a 386 microprocessor.

Another object of the present invention is to provide reset circuitry which requires minimal change to the circuitry of a 386 microprocessor computer when such computer is upgraded or redesigned to accommodate an i486 microprocessor.

In accordance with the present invention, a computer system is provided including a microprocessor, such microprocessor exhibiting a reset input and further exhibiting a clock input to which a clock signal is provided. The computer system includes a microprocessor reset circuit which is capable of generating a microprocessor reset signal. The microprocessor reset circuit includes a phase error detector for detecting a phase error between the clock signal and the reset signal. The reset circuit further includes a phase error corrector, coupled to the phase error detecting means, for adjusting the phase of the clock signal if a phase error is detected so as to substantially minimize such phase error. The reset circuit also includes a reset signal regenerator for providing a new reset signal to the reset input of the microprocessor when the phase of the clock signal is adjusted.

The features of the invention believed to be novel are specifically set forth in the appended claims. However, the invention itself, both as to its structure and method of operation, may best be understood by referring to the following description and accompanying drawings.

DETAILED DESCRIPTION OF THE INVENTION

Figure 3:
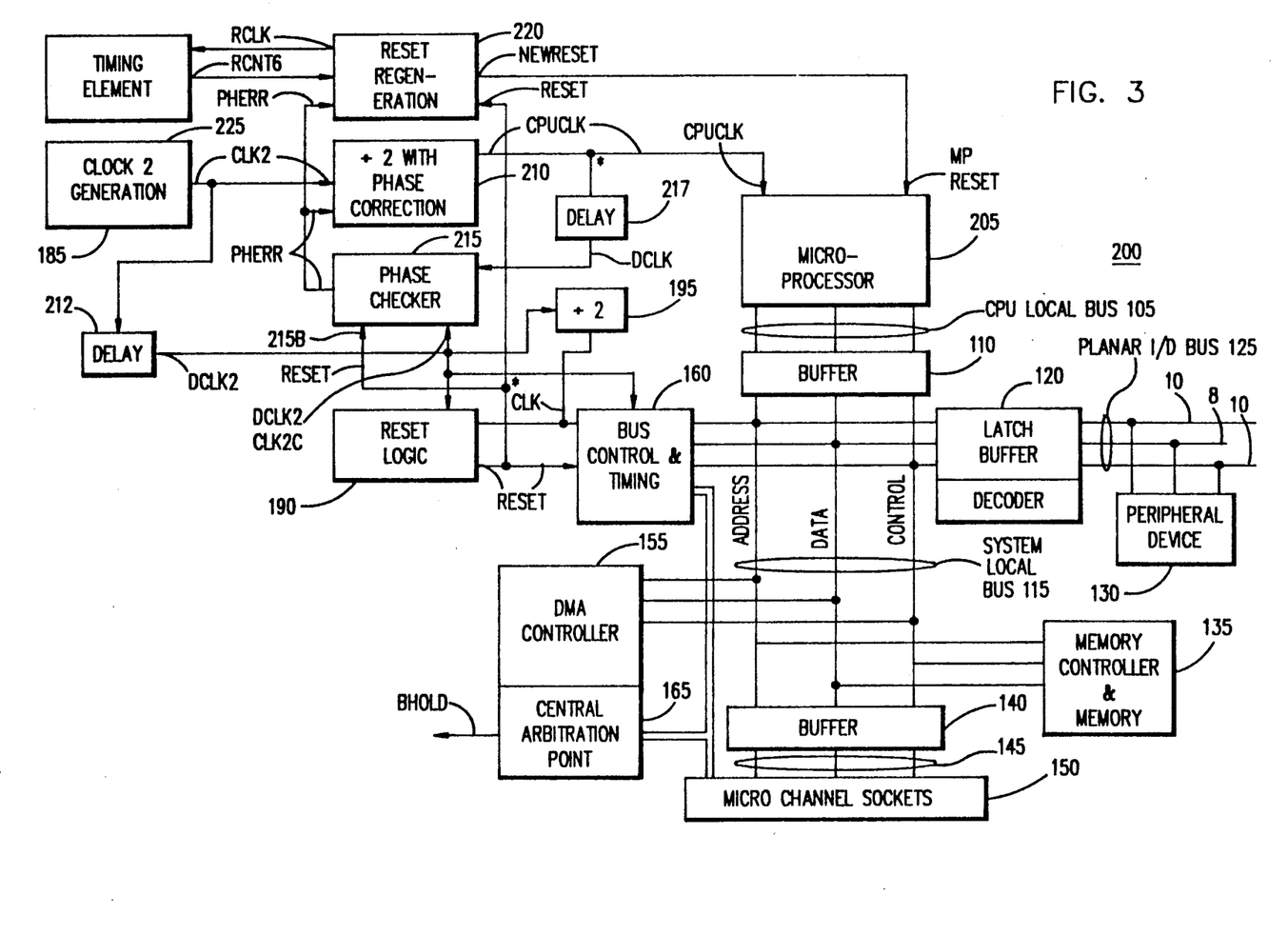
FIG. 3 is a high level block diagram of the computer system of the present invention.

FIG. 3 is a high level block diagram which depicts the computer system of the present invention as computer system 200. Computer system 200 has elements in common with computer system 10 of FIG. 1 with the exception of the modifications shown in FIG. 3 and now discussed. Like numerals are used to indicate like elements in FIG. 3 and FIG. 1.

In the preferred embodiment of the invention, computer system 200 includes an i486 microprocessor designated microprocessor 205 having a 1× clock input designated CPUCLK and a reset input designated MPRESET input as shown in FIG. 3. The internal clock frequency of microprocessor 205 is defined to be equal to 1× and the frequency of the clock signal provided to the CPUCLK input is also 1×. Microprocessor 205 is coupled to CPU local bus 105 as shown. The CLK2 output of CLK2 clock signal generation circuit 185 is coupled to the CPUCLK clock input of microprocessor 205 via a divide by two with phase correction circuit 210. The CLK2 output of CLK2 generation circuit 185 is also coupled to a time base input or clock input (DCLK2, CLK2C) of the input of a phase checker circuit 215 via a time delay circuit 212. In this manner, a time delayed version of the CLK2 clock signal, namely the DCLK2 signal, which is produced at the DCLK2 output of time delay circuit 212, is provided as the time base for phase checker 215. The DCLK2 output of time delay circuit 212 is also coupled to a time base input of reset logic circuit 190 such that the same delayed clocking information or time base signal DCLK2 is provided to phase checker 215 and reset logic 190.

Phase checker circuit 215 includes phase inputs 215A and 215B and a phase error output designated PHERR at which a phase error signal PHERR is generated which represents the phase error between signals (later described) which are provided to phase inputs 215A and 215B. The CPUCLK output of divide by 2 with phase correction circuit 210 is coupled via a time delay circuit 217 to phase input 215A of phase checker 215 such that a delayed version of the CPUCLK signal (DCLK) produced at the output of delay circuit 217 is provided to phase input 215A.

The RESET output of RESET logic circuit 190 is coupled to the remaining phase input 215B of phase checker 215 to provide reset pulse phase information thereto. Providing the DCLK and RESET signals to phase inputs 215A and 215B in this manner permits phase checker 215 to compare the phase of the delayed CPUCLK signal (DCLK) with the implicit phase of the RESET signal. If phase checker 215 detects a phase error between the DCLK signal and the RESET signal, then phase checker 215 generates a phase error signal PHERR at the PHERR output of phase checker 215. This phase error indicates that an undesirable phasing relationship exists between the CPUCLK signal (as represented by DCLK) and the CLK signal provided by divider 195. The PHERR output of phase checker 215 is coupled to the PHERR input of divided by 2 with phase correction circuit 210 to provide the PHERR signal thereto. The PHERR signal is also provided to the PHERR input of a reset regeneration generation circuit 220 which is discussed later.

Although phase checker 215 is checking the phase of the CPUCLK signal (as represented by DCLK) with respect to the RESET signal, it effectively checks the phase of the CPUCLK signal (internal microprocessor clock) with respect to the phase of the external clock signal CLK generated at the output of divider 195. This is so because the falling edge of the RESET signal generated by reset logic 190 contains clocking information with respect to the CLK external clock signal, since reset logic 190 follows the earlier timing convention compatible with the 386 microprocessor.

If phase checker 215 determines that a phase error exists between the delayed CPUCLK signal (DCLK) and the RESET signal such as during power up of microprocessor 205, then a PHERR signal is generated which drives divide by 2 with phase correction circuit 210 to bring the delayed CPUCLK signal (DCLK) into phase with the RESET signal. In this manner the phase of the CPUCLK signal is adjusted and corrected. However, when such a phase adjustment occurs, the $t_{1a}$ clock stability specification of the i486 microprocessor is violated as discussed later in more detail. When such a specification violation occurs, then reset regeneration circuit 220 regenerates or produces a new reset signal pulse (NEWRESET) which is provided to the MPRESET input of microprocessor 205 to reset microprocessor 205. As seen in FIG. 3, the RESET output of RESET logic 190 is coupled to the RESET input of RESET regeneration circuit 220 to provide the RESET signal thereto. Reset regeneration circuit 220 includes a RCLK output which is coupled to an input of a timing element 225, such timing element 225 including an RCNT6 output which is coupled back to reset regeneration circuit 220 as will be explained later. The PHERR output of phase checker 215 is coupled to a PHERR input of reset regeneration circuit 220 to inform reset regeneration circuit 220 as to when regeneration of the reset signal is required. In this manner, reset regeneration circuit 220 is informed as to when the generation of the NEWRESET pulse is needed. It is noted that supplying this NEWRESET pulse to the RESET input of microprocessor 205 results in microprocessor 205 desirably being returned to an known state.

Figure 4:
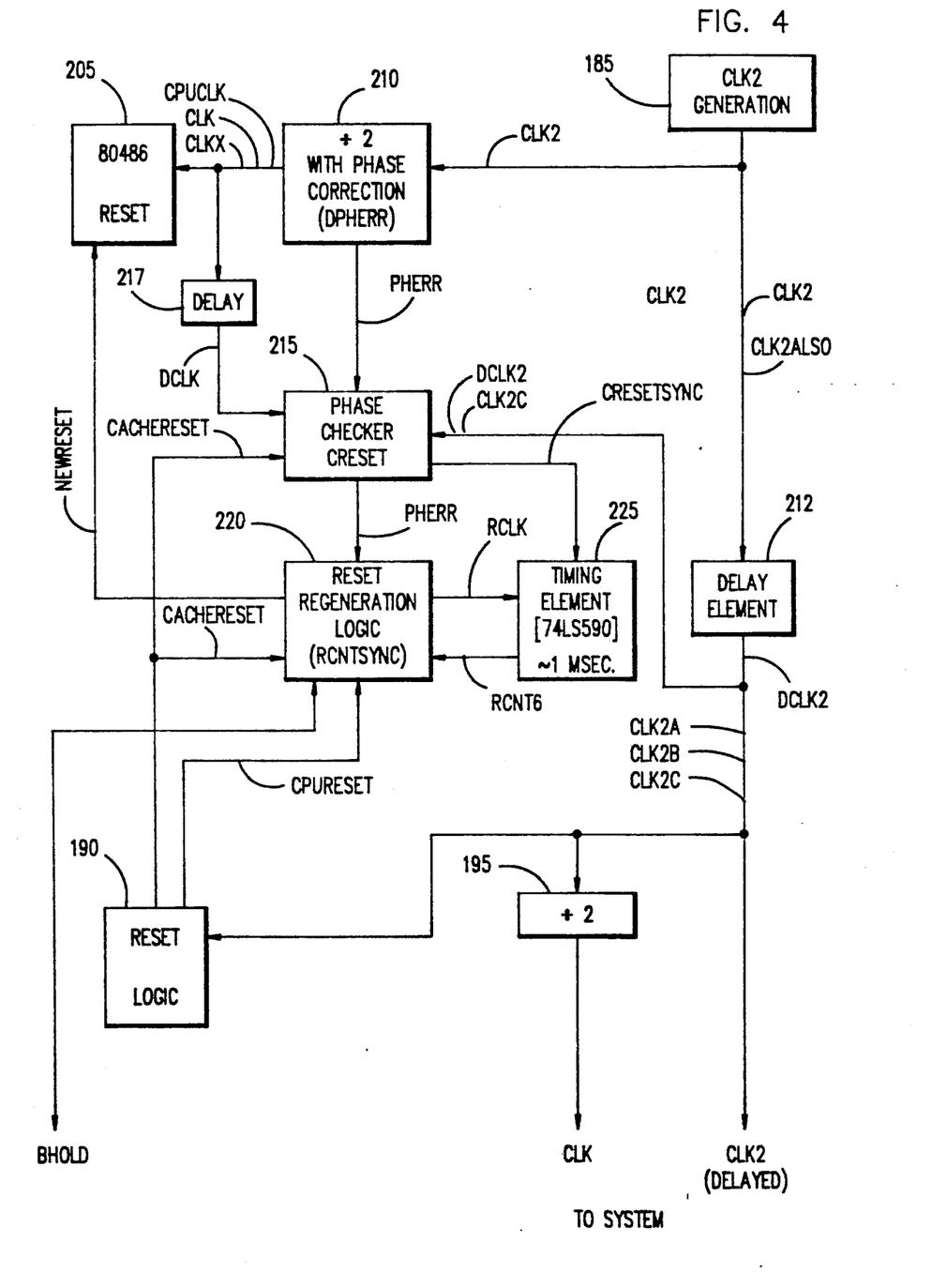
FIG. 4 is a low level, more detailed block diagram of the reset circuitry portion of the computer system of FIG. 3.

FIG. 4 is a lower level, more detailed block diagram showing the reset circuitry portion of microprocessor based computer system 200. In comparing the diagrams of FIG. 4 and FIG. 3, it will be noted that some signals, inputs and outputs have been renamed or are given alternative names as explained subsequently or as shown by the labelling in FIG. 4. This has been done to facilitate the implementation of the reset circuitry portion in programmable array logic or PAL form as will be explained in more detail later. (PAL is a registered trademark of Monolithic Memories, Inc.) Signals which are generated and used internally within the various blocks of FIG. 4 are shown in parenthesis.

The signals employed in the reset circuitry portion of FIG. 4 are the same as the signals in the reset circuitry portion of FIG. 3 except for the differences subsequently discussed. The CLK2 signal generated at the output of CLK2 clock signal generator 185 is also referred to as CLK2ALSO. The DCLK2 signal produced at the output of delay element 212 is alternatively designated CLK2A, CLK2B and CLK2C. The CPUCLK signal produced at the output of divide by 2 with phase correction circuit 210 is also referred to as CLK and CLKX. The RESET signal generated by reset logic 190 is shown in more detail in the reset circuitry of FIG. 4 as including a CPURESET signal which is supplied to reset regeneration logic 220 and further including a CACHERESET signal which is provided to reset regeneration logic 220 and phase checker 215.

A delayed version DPHERR of the phase error signal PHERR is generated internal to the divide by 2 with phase correction circuit 210 as shown in FIG. 4 and indicated in parenthesis. A CRESETSYNC signal is generated internal to phase checker 215 and is supplied to timing element 225. CRESETSYNC is a delayed and inverted version of the CACHERESET signal generated by reset logic 190.

In one embodiment of the invention, timing element 225 is a 74LS590 counter manufactured by Texas Instruments, Inc. This timing element is used to determine the required pulse width of the NEWRESET pulse, such pulse width being approximately 1 millisecond.

An input signal BHOLD is provided to reset regeneration circuit 220 as seen in FIG. 4. BHOLD is employed as an accessible timing signal which pulses once every approximately 15.6 microseconds and is used to generate the clock pulse for counter of timing element 225. RCLK is derived from BHOLD and is provided to timing element 225 as will be discussed later.

Divide by 2 with phase correction circuit 210, delay circuit 217 and delay circuit 212 are conveniently fabricated in a first PAL device as specified by the following PAL inputs, outputs and logic equations. In the subsequent logic equations, the following symbols have the meaning designated below:

| SYMBOL | DEFINITION |
|---|---|
| / | Negation |
| := | A registered term, equal to |
| = | A combinatorial term, equal to |
| & | Logical AND |
| + | Logical OR |

The first PAL device is defined to exhibit the following input pins:

| INPUT PIN | COMMENT |
|---|---|
| CLK2 | 50 MHz TTL oscillator |
| CLKALSO | 50 MHz TTL oscillator |
| PHERR | phase error |

The first PAL is defined to exhibit the following output pins:

| OUTPUT PIN | COMMENT |
|---|---|
| CLK2A | 50 MHz buffered CLK2 |
| DCLK | delayed 25 MHz clock |
| CLK | 25 MHz clock to i486 and PALS |
| DPHERR | phase error pulse |
| CLKX | 25 MHz clock to i486 and PALS |
| CLK2C | 50 MHz buffered CLK2 |
| CLK2B | 50 MHz buffered CLK2 |

The following logic equations describe the logic implementation within the first PAL device:

```
CLK2A    = CLK2ALSO
CLK2B    = CLK2ALSO
CLK2C    = CLK2ALSO
!CLK    := (CLK & PHERR)
          # (CLK & !PHERR & !DPHERR)
!CLKX   := (CLK & PHERR)
          # (CLK & !PHERR & !DPHERR)
!DPHERR:=  (!PHERR & CLK)
          # (!DPHERR & !CLK)
DCLK    =  CLK
```

Phase checker 215 and reset regeneration logic 220 are conveniently fabricated in a second PAL device as specified by the following PAL inputs, outputs and logic equations. Accordingly, the second PAL device is defined to exhibit the following input pins:

| INPUT PIN | COMMENT |
|---|---|
| CLK2C | 50 MHz TTL CLK2 |
| DCLK | 25 MHz delay CPU clock |
| CACHERESET | cache reset pulse |
| CPURESET | CPU reset pulse |
| HOLD | CPU hold request |
| RCNT6 | reset counter bit 6 |

The second PAL is defined to exhibit the following output pins:

| OUTPUT PIN | COMMENT |
|---|---|
| NEWRESET | new CPURESET including phasing |
| RCLK | reset counter clock |
| PHERR | phase error pulse |
| CRESETSYNC | delayed and inverted CACHERESET |
| RCNTSYNC | sampled version of input RCNT6 |

The following logic equations describe the logic implementation within the second PAL device.

```
!CRESETSYNC := CACHERESET
NEWRESET   := CPURESET
              # !PHERR & !CACHERESET
              # NEWRESET & !RCNTSYNC & CRESETSYNC
              & !PHERR
!PHERR     := DCLK & !CRESETSYNC & !CACHERESET
              #!PHERR & !RCNTSYNC & !CACHERESET
              # !PHERR & !DCLK
!RCLK      := !DCLK & !PHERR & CRESETSYNC & HOLD
              #RCLK & !DCLK & CACHERESET
              # !RCLK & DCLK
RCNTSYNC   := RCNT6 & !DCLK
              # RCNTSYNC & DCLK
```

Figure 5:
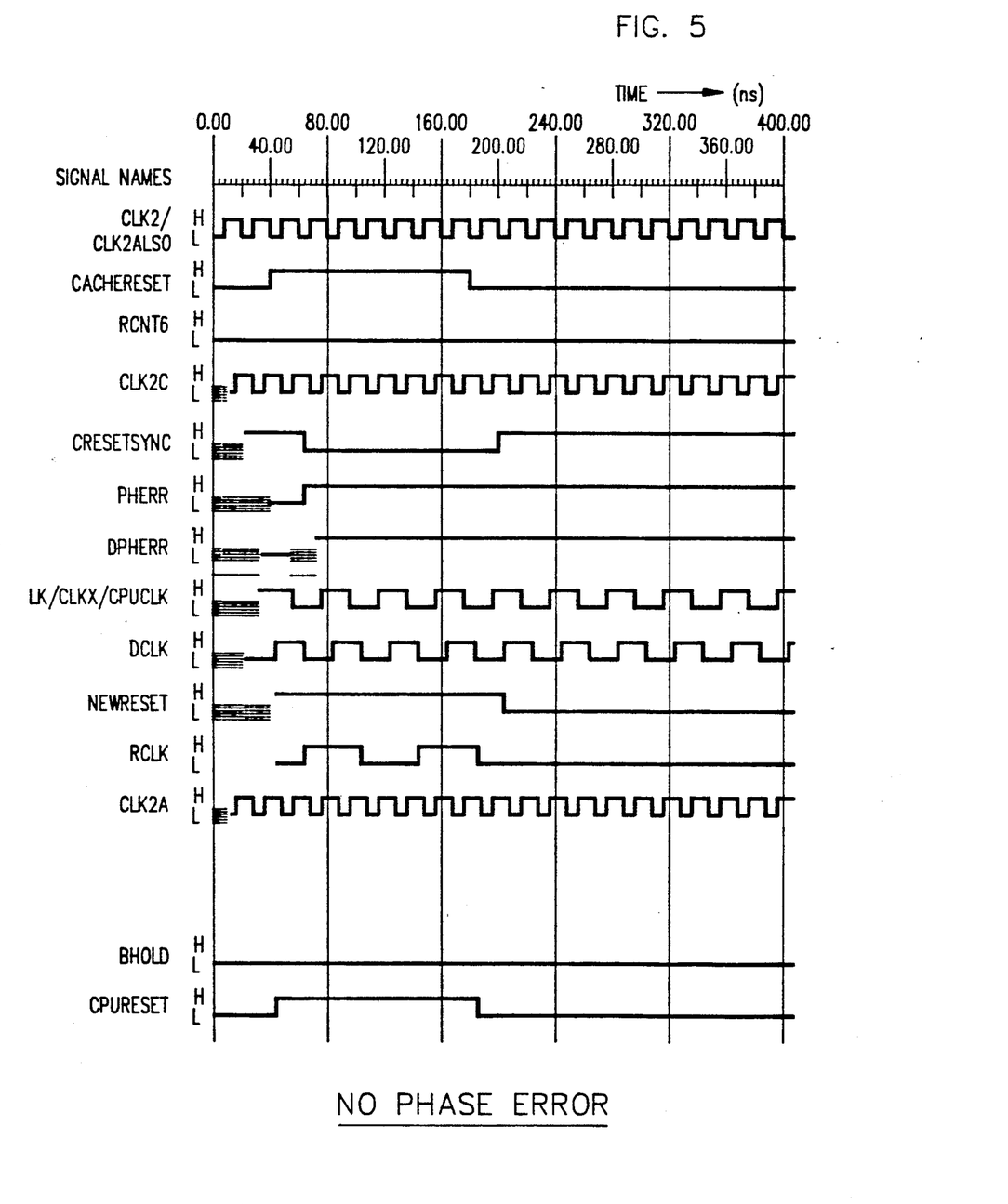
FIG. 5 is a timing diagram showing the operation of the reset circuitry of FIG. 4 when no phase error occurs.

FIG. 5 is a timing diagram which shows the operation of the reset circuitry of FIG. 4 by illustrating the CLK2/CLK2ALSO, CACHERESET, RCNT6, CLK2C, CRESETSYNC, PHERR, DPHERR, CLK/CLKX/, CPUCLK, DCLK, NEWRESET, RCLK, CLK2A, BHOLD and CPURESET signals of such reset circuitry on a common time axis. FIG. 5 illustrates the case where no phase error occurs as seen by observing the consistently high PHERR signal.

Figure 6:
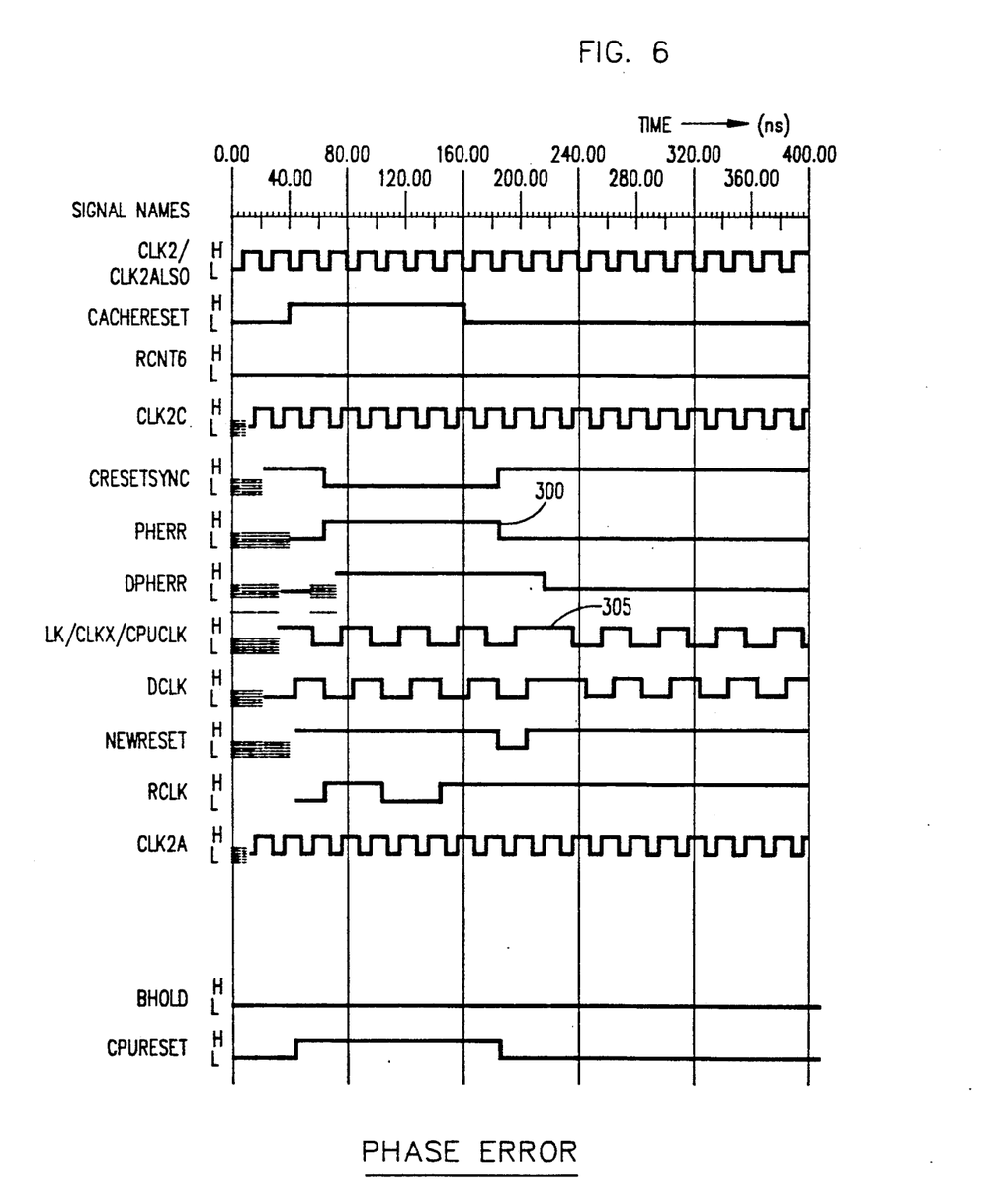
FIG. 6 is a timing diagram showing the operation of the reset circuitry of FIG. 4 when a phase error occurs.

FIG. 6 is a timing diagram which shows the operation of the reset circuitry of FIG. 4 by illustrating the CLK2/CLK2ALSO, CACHERESET, RCNT6, CLK2C, CRESETSYNC, PHERR, DPHERR, CLK/CLKX/, CPUCLK, DCLK, NEWRESET, RCLK, CLK2A, BHOLD and CPURESET signals of such reset circuitry on a common time axis. FIG. 6 illustrates the case where a phase error occurs as observed at the falling edge of the PHERR signal at 300. The reset circuitry corrects this phase error as seen at the lengthened CLK pulse at 305.

Figure 7:
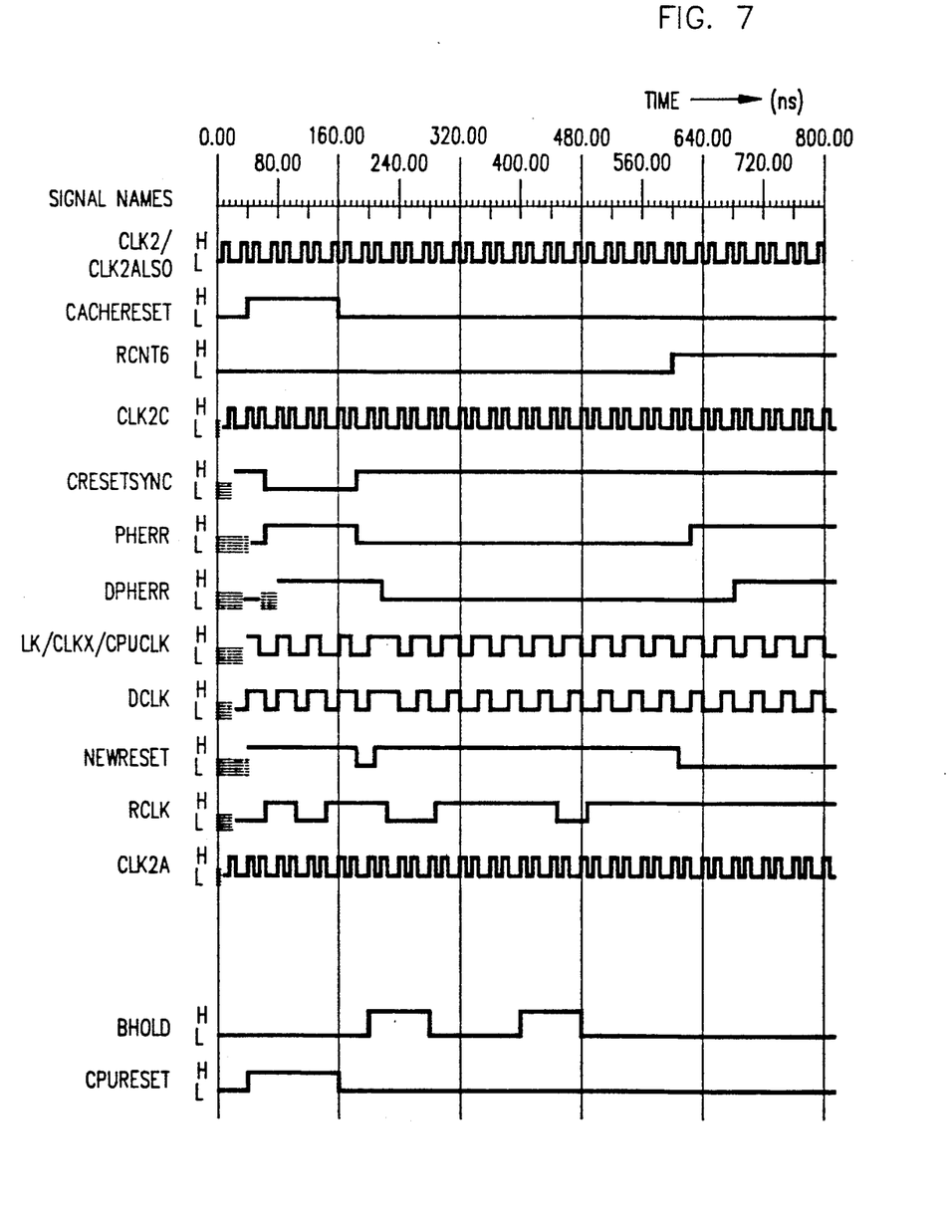
FIG. 7 is a timing diagram employing a time compressed time axis to show the operation of the reset circuitry of FIG. 4.

FIG. 7 is a timing diagram which shows the operation of the reset circuitry of FIG. 4 by illustrating the CLK2/CLK2ALSO, CACHERESET, RCNT6, CLK2C, CRESETSYNC, PHERR, DPHERR, CLK/CLKX/, CPUCLK, DCLK, NEWRESET, RCLK, CLK2A, BHOLD and CPURESET signals of such reset circuitry on a common time axis over a longer duration of time than in the timing diagrams of FIG. 5 and FIG. 6 by compressing the time axis. The timing diagram of FIG. 7 illustrates how the RCLK and BHOLD signals operate to time out the counter within timing element 225. RCNT6 provides the return signal from this counter. As illustrated in FIG. 7, for convenience of presentation, BHOLD pulses at less than the previously stated 15.6 microsecond rate, and RCLK is counted for only two counts here instead of $2^7$ counts as it does in actual practice in one embodiment of the invention.

The following is a summary of the operation of the reset circuitry portion of computer system 200 of FIG. 3 and FIG. 4. When computer 200 is initially powered up or when reset logic 190 is otherwise instructed to generate a reset pulse, reset logic 190 generates an initial reset pulse designated RESET. The initial reset pulse RESET is supplied to reset regeneration circuit 220 which passes this initial RESET pulse on to microprocessor 205 via the NEWRESET line which is later used to transmit the NEWRESET pulse to microprocessor 205. Thus, the initial RESET pulse causes microprocessor 205 to execute an internal microprocessor reset operation. This initial RESET pulse is also provided to phase checker 215 which uses this RESET pulse in the manner described below in the discussion of phase checker 215.

The logic provided in the reset circuitry performs a divide by two operation at divider/phase corrector 210 on the CLK2 clock signal of the CLK2 generator which exhibits a 2× clock frequency to provide microprocessor 205 with an appropriate clock signal exhibiting a 1× clock frequency at the CPUCLK input thereof. Phase checker 215 then determines if a phase error occurs between the CPUCLK signal and the RESET signal generated by reset logic 190. (The RESET signal carries indicia of the phase of the CLK 1× external clock signal.) Such a phase error is typical at microprocessor power up. If such a phase error is detected, then the phase of the CPUCLK signal is corrected by divider/phase corrector 210. However, when the phase of the CPUCLK signal is so corrected and shifted, the Intel timing specification for the i486 clock stability is violated ($t_{1a}$ specification is 0.1% maximum change between adjacent CPUCLK clock pulses).

If a corrective CPUCLK phase shift is required, then reset regeneration circuit 220 generates a new reset pulse NEWRESET which is supplied to the MPRESET input of microprocessor 205 to reset microprocessor 205 to a known state. In other words, if a CPUCLK phase shift is required due a detected phase error, the MPRESET input of microprocessor 205 is redriven to its active state and held there for a full reset interval (approximately 1 millisecond), thus clearing any errors internal to microprocessor 205 caused by the CPUCLK phase error.

Additional operational details of the reset circuit of FIG. 3 and FIG. 4 are now discussed together with a summary of the various signals or terms employed in the reset circuit of FIG. 4. The output terms CPUCLKA, CPUCLKB and CPUCLKC shown in FIG. 4 are delayed versions of the CLK2 clock signal from CLK2 generator 185. The terms are employed to compensate for time delays resulting from divider/phase corrector 210. The time delay element 212 used to generate these terms assures minimal skewing of the timing requirements in the remainder of the system circuitry.

CLK and CLKX in FIG. 4 are duplicate versions of the divided by 2 or 1× CPUCLK signal which is used to clock microprocessor 205. DCLK is a time delayed version of the CPUCLK, such DCLK signal being one input to phase checker 215 as already described. DPHERR is a logic term used internally to divider/phase corrector 210 in setting the proper phase of CPUCLK, CLK and CLKX. It is noted that the output PHERR will go active (low) if a phase error is detected between the CPUCLK signal (as represented by DCLK) and the RESET (CACHERESET) signal provided to phase checker 215. As discussed above, the phase error signal PHERR is employed in reset regeneration circuit 220 to drive the NEWRESET signal active (high) into the MPRESET input of microprocessor 205 thus returning microprocessor 205 to a known state.

As seen in FIG. 3, the central arbitration point includes a bus hold request output BHOLD. When the aforementioned phase error is detected, depending on the timing of the BHOLD signal, output RCLK will pulse low, following the state of the BHOLD signal (inverted). The BHOLD signal, shown in FIG. 4 as being provided to reset regeneration logic 220, is employed as a timer signal. In this particular embodiment of the invention wherein CPUCLK exhibits a frequency of 25 MHz, the BHOLD signal pulses once every approximately 15.6 microseconds. These BHOLD pulses pulse the RCLK output of reset regeneration logic 220. This action in turn increments the 74LS590 counter in timing element 225 once every approximately 15.6 microseconds. This counter increments for $2^7$ counts, yielding a total of approximately 1 millisecond, before the $2^7$ counter bit connected to RCNT6 goes active. When this timer bit RCNT6 goes active, it is employed to deactivate the NEWRESET signal, the generation of which was described earlier. In this manner, the duration of the NEWRESET pulse is controlled and set. After NEWRESET goes inactive, both the microprocessor 205 and the remainder of computer system 200 are synchronized and operation of computer system 200 can begin.

The terms CRESETSYNC and RCNTSYNC are used internally within the PAL logic implementation of the reset circuit of FIG.'s 3 and 4. Additionally, CRESETSYNC is used externally to clear the 74LS590 counter to its initial zero count.

While a computer system reset circuit apparatus has been described above, it will be appreciated that a method for resetting a microprocessor has also been disclosed. Such method is employed in a computer system including a microprocessor, such microprocessor exhibiting a reset input and further exhibiting a clock input to which a clock signal is provided. The computer system in which the method is practiced is capable of generating a microprocessor reset signal. More specifically, a method for resetting the microprocessor in such system is disclosed and includes the step of detecting a phase error between said clock signal and the reset signal. The method further includes the step of adjusting the phase of the clock signal if a phase error is detected so as to substantially minimize the phase error. The method also includes the step of providing a new reset signal to the reset input of the microprocessor in the event that the phase of the clock signal is adjusted.

The foregoing has described an apparatus and method for resetting the reset input in a microprocessor based computer system. The apparatus and method disclosed provides reset circuitry which, in one embodiment of the invention, permits an i486 microprocessor to operate in a computer which originally employed a 386 microprocessor. The apparatus and method provides reset circuitry which requires minimal change to the circuitry of a 386 microprocessor computer when such computer is upgraded with an i486 microprocessor. In one embodiment of the invention, the apparatus and method desirably overcomes reset timing difficulties experienced in a computer system in which a processor upgrade from a 386 microprocessor to an i486 microprocessor is attempted.

While only certain preferred features of the invention have been shown by way of illustration, many modifications and changes will occur to those skilled in the art. It is, therefore, to be understood that the present claims are intended to cover all such modifications and changes which fall within the true spirit of the invention.

I claim:

1. In a computer system including a microprocessor, said microprocessor exhibiting a reset input and further exhibiting a clock input to which a clock signal is provided, a microprocessor reset circuit comprising:

reset signal generating means for generating an initial reset signal;

phase error detecting means for detecting a phase error between said clock signal and said initial reset signal;

phase error correcting means, coupled to said phase error detecting means, for adjusting the phase of said clock signal if a phase error is detected so as to substantially minimize said phase error, and reset signal regenerating means, coupled to clock input of said microprocessor, for providing a new reset signal to the reset input of said microprocessor whenever the phase of said clock signal is adjusted.

2. In a computer system including a microprocessor, said microprocessor exhibiting a reset input and further exhibiting a clock input responsive to a 1× clock signal, said system being capable of generating a 2× clock signal, a microprocessor reset circuit comprising:

reset signal generating means for generating an initial reset signal;

dividing means for dividing said 2× clock signal by 2 external to said microprocessor to produce said 1× clock signal;

means for supplying said 1× clock signal to the clock input of said microprocessor;

phase error detecting means, responsive to said 1× clock signal and said initial reset signal, for detecting a phase error between said 1× clock signal and said initial reset signal;

phase error correcting means, coupled to said phase error detecting means, for adjusting the phase of said 1× clock signal if a phase error is detected so as to substantially minimize said phase error, and regenerating means, responsive to said phase error correcting means, for providing a new reset signal to the reset input of said microprocessor whenever the phase of said 1× clock signal is adjusted.

3. A computer system comprising:

a microprocessor including a reset input and further exhibiting a clock input responsive to a 1× clock signal, memory means, coupled to said microprocessor, for storing information therein;

a bus coupling said microprocessor to said memory means;

reset signal generating means for generating an initial reset signal;

clock signal generating means for generating a 2× clock signal;

dividing means for dividing said 2× clock signal by 2 external to said microprocessor to produce said 1× clock signal;

means for supplying said 1× clock signal to the clock input of said microprocessor;

phase error detecting means, responsive to said 1× clock signal, for detecting a phase error between said 1× clock signal and said reset signal;

phase error correcting means, coupled to said phase error detecting means, for adjusting the phase of said 1× clock signal if a phase error is detected so as to substantially minimize said phase error, and regenerating means, responsive to said phase error correcting means, for providing a new reset signal to the reset input of said microprocessor whenever the phase of said 1× clock signal is adjusted.

4. In a computer system including a microprocessor, said microprocessor exhibiting a reset input and further exhibiting a clock input to which a clock signal is provided, a method for resetting said microprocessor comprising the steps of:

generating an initial reset signal;

detecting a phase error between said clock signal and said initial reset signal;

adjusting the phase of said clock signal if a phase error is detected so as to substantially minimize said phase error, and providing a new reset signal to said reset input of said microprocessor whenever the phase of said clock signal is adjusted.

5. In a computer system including a microprocessor, said microprocessor exhibiting a reset input and further exhibiting a clock input responsive to a 1× clock signal a method for resetting said microprocessor comprising the steps of:

generating an initial reset signal;

generating a 2× clock signal;

dividing said 2× clock signal by 2 external to said microprocessor to produce said 1× clock signal;

providing said 1× clock signal to the clock input of said microprocessor;

detecting a phase error between said 1× clock signal and said initial reset signal;

adjusting the phase of said 1× clock signal if a phase error is detected so as to substantially minimize said phase error, and providing a new reset signal to said reset input of said microprocessor whenever the phase of said 1× clock signal is adjusted.

* * * * *